United States Patent Office 2,982,615
Patented May 2, 1961

2,982,615
PROCESS FOR RECOVERING ACID FROM WASTE ACID LIQUORS

Bryce H. McMullen, Matawan, and Robert D. Toomey, Little Silver, N.J., assignors to National Lead Company, New York, N.Y., a corporation of New Jersey No Drawing. Filed May 9, 1957, Ser. No. 658,032

5 Claims. (Cl. 23—172)

The present invention relates to the treatment of waste acid liquors and more expressly to the production of a precipitate-free sulfuric acid concentrate from waste acid liquors resulting from acid digestion of titaniferous ores or concentrates.

Perhaps the most widely known method for preparing titanium dioxide pigment material is that of solubilizing titaniferous iron ore in concentrated sulfuric acid to form a digestion cake which is dissolved in water and weak acid to form a sulfate solution of titanium and iron values. Scrap iron or its equivalent is then added to the sulfate solution to reduce ferric iron values to ferrous iron, after which the solution is clarified, filtered and crystallized. The latter step is carried out to effect removal of most of the iron from the sulfate solution as copperas, $FeSO_4 \cdot 7H_2O$. The sulfate solution then is concentrated and thereafter hydrolyzed to precipitate a titanium dioxide hydrate which is removed from the sulfate solution by filtration.

Coincident with precipitation of the titanium hydrate from the sulfate solution, an appreciable amount of sulfuric acid is liberated with the result that after filtration of the hydrolyzed sulfate solution to recover the titanium hydrate, the residual filtrate, or waste acid liquor as it is sometimes called, contains appreciable amounts of sulfuric acid together with ferrous sulfate, titanium values, and a major portion of the impurities originally in the ore.

It has been attempted heretofore to treat these waste acid liquors so as to crystallize and remove a part of the iron values as ferrous sulfate for the purpose of concentrating and recovering the free acid values from the treated liquor, but inevitably a highly voluminous, gelatinous sludge has been formed in the liuqor. This sludge is not amenable to filtration and causes excessive scaling of equipment, blinding of filter cloths, and gelling of tank contents, any one or all of which factors contribute to shutdowns and inefficient operations. All previous efforts to remove this gelatinous sludge from the concentrated liquor have been unsatisfactory. Thus, the recovery and concentration of free-acid values from waste acid liquors has not been achieved on a satisfactory commercial scale; and as a consequence, waste acid liquors are quite generally thrown away with the result that huge quantities of sulfuric acid are irretrievably lost to industry.

In the copending application of Walwark, entitled "Process for Recovering Acid from Waste Acid Liquors," Serial No. 500,688, filed April 11, 1955, and assigned to the assignee of the instant invention, Walwark discloses a method for treating these waste acid liquors in a manner such as to preclude the formation of gelatinous sludge and to produce a crystallization filtrate which is substantially free of aluminum values and hence suitable for producing highly concentrated sulfuric acid.

Briefly, the method disclosed in the above identified copending application comprises adding an alum forming constituent such as ammonia or ammonium sulfate to the waste acid liquor and then cooling the admixture to a temperature below $-10°$ C. and preferably as low as $-30°$ C. so as to tie up the aluminum values in an alum salt together with the other metallic impurities such as iron, magnesium and the like, in the form of a filterable crystalline mass. By this process a crystallization filtrate is obtained in which residual aluminum sulfate is present in innocuous amounts. These filtrates have been found to be ideally suited to concentration and have been concentrated to an acid content of 80% and even as high as 98.5% by blending with oleum, without exhibiting excessive sludge formation.

However, while acid concentrates made by this process are in most instances wholly suitable for commercial applications, it has been found that these acid concentrates may throw down a solid precipitate after prolonged periods of storage and as a consequence the commercial potential of the concentrate is seriously limited.

An object, therefore, of the present invention is to provide a highly concentrated acid which will remain free of solid precipitates over long periods of storage or upon further concentration.

Another object of the invention is to provide an improved method for preparing highly concentrated solids-free sulfuric acid from a waste acid liquor.

A further object of the invention is to provide an improved method for removing metallic impurities from a waste acid liquor such that the acid concentrate can be stored for extended periods of time and remain free of precipitates.

A still further object of the invention is to provide an improvement in a method for producing a solids-free acid concentrate from a waste acid liquor wherein the metal impurities including aluminum, iron, magnesium and titanium are removed as filterable crystals by refrigeration and filtration and the residual iron, magnesium and titanium sulfate values in the crystallization filtrate are removed from the filtrate in the form of a complex salt.

These and other objects, features and advantages of this invention are hereinafter explained in greater detail in the description which follows.

Broadly, the instant invention contemplates a method for producing a clear sulfuric acid concentrate from waste acid liquors by effecting an adjustment of the molar ratio of the iron, titanium and magnesium sulfates in the liquor such that these metallic impurities will form and precipitate out of the liquor as a complex salt. More especially, the invention contemplates an improved process for recovering a solids-free acid concentrate from waste acid liquors by cooling the liquors to a temperature at which the aluminum values are precipitated out as filterable alum crystals along with the major portion of the iron, magnesium and titanium values the iron, magnesium and titanium values remaining in solution in the filtrate after filtration being present in such proportion that concentrating said filtrate by evaporation to remove water and then aging the concentrated filtrate at a temperature within the range of from 50 to 100° C. precipitates the remaining iron, magnesium and titanium values in the form of a complex salt having the formula $(Fe,Mg)SO_4 \cdot TiOSO_4 \cdot 2(H,NH_4)_2SO_4$.

For purposes of illustration the process of the instant invention is described as an improvement in the method for producing an acid concentrate as described in the above identified copending application of Walwark. According to his method substantial amounts of metallic impurities such as iron, magnesium and aluminum are removed from a waste acid filtrate as a filterable crystalline mass by crystallization of the waste acid liquor at a low temperature in the presence of ammonium ions.

A crystallization filtrate typical of those produced by the Walwark process has the following analysis (percent by wt.):

| | | | |
|---|---|---|---|
| $H_2SO_4$ | 28.6 | $MgSO_4$ | 0.436 |
| $FeSO_4$ | 1.27 | Mn | 0.092 |
| $TiOSO_4$ | 1.428 | Cr | 0.0066 |
| $(NH_4)_2SO_4$ | 0.885 | V | 0.025 |
| $Al_2(SO_4)_3$ | 0.054 | $H_2O$ | balance |

In order to appreciate fully the significance of the process of the instant invention for producing clear concentrated sulfuric acid from waste acid filtrate liquors it should be realized that despite the extremely low percentage of metallic impurities in the filtrates produced by the Walwark process these acid filtrates, when concentrated to 80% $H_2SO_4$ and aged, were not consistently free of solids especially over long periods of storage. It became mandatory, therefore, to first discover the cause of this inconsistency in the solids content of the acid concentrate and then to find a solution to the problem.

An intensive investigation of the cause of this inconsistency was made using two approaches; namely, to show a correlation between the precipitates formed in the concentrated acid and its composition, or the composition of the waste acid filtrate from which it is prepared; and to investigate the structure of the solids which precipitate during storage of the acid concentrate.

In pursuing the first approach, acid samples from 23 concentrations were classified as to precipitates, see Table I below, and the iron content expressed as percent $FeSO_4$ was plotted against the titanium values expressed as percent $TiOSO_4$.

TABLE I $FeSO_4$ and $TiO_2$ content of acid concentrate 80% $H_2SO_4$ concentrate

| Run | Percent $FeSO_4$ | Percent $TiO_2$ | Remarks |
|---|---|---|---|
| K-17 | 0.13 | 0.26 | |
| 18 | 0.23 | 0.24 | |
| 19 | 0.19 | 0.24 | |
| L-44 | 0.25 | 0.08 | |
| 58 | 0.24 | 0.02 | Clear, or very slightly turbid acids. |
| 45 | 0.06 | 0.15 | |
| 29 | 0.09 | 0.44 | |
| 30 | 0.18 | 0.37 | |
| 43 | 0.09 | 0.26 | |
| 46 | 0.26 | 0.02 | |
| 34 | 0.11 | 0.15 | |
| L-47 | 0.28 | 0.02 | |
| 49 | 0.49 | 0.01 | |
| K-20 | 0.62 | 0.02 | |
| L-31 | 0.46 | 0.06 | |
| 41 | 0.43 | 0.02 | |
| 42 | 0.27 | 0.05 | Acids containing precipitates. |
| 32 | 0.63 | 0.02 | |
| 33 | 0.34 | 0.05 | |
| 57 | 0.48 | 0.03 | |
| 61 | 0.48 | 0.03 | |
| 60 | 0.40 | 0.03 | |
| 59 | 0.40 | 0.03 | |

The findings of this study indicated that when there is more than about 0.25% free $FeSO_4$ in the acid concentrate, these values will be precipitated out in the acid. On the other hand, an acid concentrate having less than about 0.25% free $FeSO_4$ remains free of precipitates. This data also indicated that the quantities of $FeSO_4$ and $TiOSO_4$ in a solids-free acid concentrate are related in such a way that if the quantity of either one is high in the acid, the quantity of the other will be low.

From a further study of the relationship between the $FeSO_4$ and $TiOSO_4$ values, a series of runs were made on concentrated acids of various compositions. The data from these runs is tabulated in Table II below.

TABLE II

*Acid concentrate*

| Aging period (hrs.) | Filtrate Ratio[1] | Free $H_2SO_4$ | $FeSO_4$ | $TiOSO_4$ | $MgSO_4$ | Volume Percent Precipitate in the 80% $H_2SO_4$ |
|---|---|---|---|---|---|---|
| 1 | | 78.6 | 0.79 | 1.27 | 0.62 | 13 |
| 8 | | 80.6 | 0.09 | 0.33 | 0.15 | 4 |
| 16 | 1.16 | 81.5 | 0.12 | 0.35 | 0.20 | 5 |
| 24 | | 83.0 | 0.21 | 0.05 | 0.28 | 2 |
| 1 | 2.86 | 80.0 | 0.77 | 0.08 | | 29 |
| 8 | 2.86 | 79.8 | 0.55 | 0.07 | 0.53 | 17 |
| 16 | 2.86 | 81.6 | 0.84 | 0.05 | 0.34 | 18 |
| 24 | 2.86 | 80.6 | 0.72 | 0.04 | 0.44 | 14 |
| 1 | 0.82 | 77.5 | 0.09 | 2.24 | | 5 |
| 8 | 0.82 | 78.6 | 0.14 | 2.06 | | 5 |
| 16 | 0.82 | 78.4 | 0.13 | 1.71 | | 5 |
| 1 | 1.12 | 79.4 | 0.09 | 0.64 | | 3 |
| 8 | 1.12 | 81.6 | 0.08 | 0.92 | | trace |
| 16 | 1.12 | 81.0 | 0.07 | 0.51 | | trace |
| 24 | 1.12 | 79.9 | 0.08 | 0.45 | | trace |

[1] Molar ratio $\frac{FeSO_4 + MgSO_4}{TiO_2}$ in crystallization filtrate.

The derivation of the filtrate ratios $$\frac{(FeSO_4 + MgSO_4)}{TiO_2}$$

was made from crystallization filtrates having the following analyses:

TABLE III

*Crystallization filtrates*

| Ratio | $FeSO_4$ | $MgSO_4$ | $TiOSO_4$ |
|---|---|---|---|
| 1.16 | 0.8 | 0.5 | 1.3 |
| 2.86 | 2.8 | 0.8 | 1.4 |
| 0.82 | 2.5 | 0.8 | 4.5 |
| 1.12 | 0.9 | 0.5 | 1.4 |

From this data it was discovered that it is the ratio of $(FeSO_4 + MgSO_4)$ to $TiOSO_4$ and not the quantity of free $FeSO_4$ or free $TiOSO_4$ which affects the solids content of the acid concentrate. Thus, an acid in which the molar ratio of $(FeSO_4 + MgSO_4)$ to $TiOSO_4$ is low, that is to say in the range of from 0.8 to 1.25, will remain substantially free of precipitates over long periods of storage; and an acid which is high in $FeSO_4$, that is to say has a $FeSO_4$ content as high as 2.48, can be altered to insure a much lower amount of solids in the acid concentrate by the simple device of increasing the $TiOSO_4$ values such that the ratio of $(MgSO_4 + FeSO_4)$ to $TiOSO_4$ in the acid to within the range of from 0.8 to 1.25.

The second phase investigated was that of determining the actual structure of the precipitates formed in an acid concentrate, for it was theorized that by controlling the conditions governing the formation and precipitation of the solids, a substantially solids-free acid could be achieved consistently.

X-ray analysis of 15 precipitates from acid concentrates were made showing in each case the pattern of one complex salt which appeared to have the following formula: $(Fe,Mg)SO_4 \cdot TiOSO_4 \cdot 2(H,NH_4)_2SO_4$.

It was also discovered that the precipitates found in acid concentrates prepared from waste acid liquors having a high ratio of iron to titanium included $$(Fe,Mg)SO_4 \cdot H_2O$$

along with the complex salt; and that a waste acid liquor having a low ratio of $FeSO_4 : TiOSO_4$ contained $TiOSO_4$ in addition to the above identified complex salt.

On the basis of this work it became clear that for the production of a solids-free acid concentrate it was requisite that the iron, magnesium and titanium values, if present, in the crystallized filtrate, be present in a molar ratio of $$\frac{FeSO_4+MgSO_4}{TiOSO_4}$$

of about 1 so as to form and precipitate out the above identified complex salt only during concentration and aging.

Although theoretically a molar ratio of 1 would give a substantially solids-free acid since it would provide a balance between the molar quantities of $FeSO_4$, $MgSO_4$ and $TiOSO_4$, thus promoting their removal from the acid concentrate by precipitation of the aforesaid complex salt, it was further discovered that a ratio of 1 leaves a high (greater than 0.4%) $TiOSO_4$ content in the acid which tends to precipitate after short periods of storage. However, at ratios within the preferred range of from 1.1 to 1.20 both iron and titanium values are relatively low and a substantially solids-free acid is obtained.

Having discovered the cause of acid concentrate precipitations and the factors requisite to controlling the production of a solids-free acid concentrate, the work was carried further to discover a method for maintaining the requisite controls. In this connection it was found that the temperature of crystallization of the waste acid liquor and the concentration of the acid were factors in adjusting the molar ratio of the iron, magnesium and titanium values.

The dependence of the molar ratio of $$(FeSO_4+MgSO_4)/TiOSO_4$$

on the strength of the acid liquor is due to the fact that the solubilities of the iron and magnesium sulfate decrease with increasing sulfuric acid strength. This is particularly true of the iron sulfate and holds to a lesser degree for the magnesium sulfate. The solubility of the titanium sulfate is relatively independent of acid strength within the ranges of acid strength and temperature herein concerned. Accordingly, it becomes necessary, when dealing with waste acid samples having different acid strengths, to choose chilling temperatures capable of balancing the quantities of iron and magnesium values remaining in solution with the quantity of titanium values in solution. This is done from knowledge of the solubilities of each of the materials in acids of various strengths at different temperatures.

The solubilities of the iron, magnesium and titanium values are dependent upon the concentration of the $H_2SO_4$ at the end of the crystallization, which, in turn, is dependent upon the $H_2SO_4$ concentration of the waste acid feed to the crystallization step and also upon the $FeSO_4$ content of the waste acid. For example, two batches of waste acid having identical $H_2SO_4$ concentrations but having different $FeSO_4$ content would have different $H_2SO_4$ concentrations after crystallization at the same temperature. This is because the acid having the greater $FeSO_4$ content will lose a greater weight of $FeSO_4$ and a correspondingly greater weight of water (as $FeSO_4.7H_2O$) during crystallization. It has been found that for waste acids having an acid concentration within the range of 18% to 26% $H_2SO_4$ including iron and magnesium impurities at the levels found in waste acids recovered from titanium pigment sulfate processes, the acid concentration after crystallization will be within the range of from 23% to 33% $H_2SO_4$.

Because of the dependence of the solubility of the iron and magnesium concentrations in the waste acid upon acid strength and temperature, it was found that to obtain the desired molar ratio of $(FeSO_4+MgSO_4)/TiOSO_4$ in a crystallization filtrate having, for example, 33% $H_2SO_4$, a temperature at least as low as $-26°$ C. to as low as $-32°$ C. is required; if the crystallization filtrate contains 23% $H_2SO_4$, a crystallization temperature at least as low as $-41°$ C. to as low as $-47°$ C. is required. At acid strengths between 23% and 33%, the temperatures required will be between the maximum and minimum temperatures of $-26°$ C. and $-47°$ C. respectively, the temperature differential between the maximum and minimum temperatures for any acid strength being $6°$ C.

If the waste acid is chilled by a refrigeration method which utilizes a cold surface, (e.g., a coil, containing cold brine) it will be found that at or below temperatures ranging from $-18°$ C. for a waste acid yielding a 23% $H_2SO_4$ crystallization filtrate to $-55°$ C. for a waste acid which will yield a 33% $H_2SO_4$ crystallization filtrate, ice will form on the chilling surface and interfere considerably with its functioning as a heat transfer medium.

The icing of the heat transfer surfaces can be avoided if an antifreeze agent is present in the waste acid. It is a part of this invention to prevent the freezing of ice on the heat transfer surface by strengthening the $H_2SO_4$ content of the waste acid by means of an antifreeze and in particular $H_2SO_4$ obtained as an intermediate product and/or the final product of the instant process. This will raise the freezing temperature of the waste acid so that no ice will form and will also make it possible to obtain the desired $(FeSO_4+MgSO_4)/TiOSO_4$ molar ratio without cooling to such a low temperature as would otherwise have been necessary. This is because of the temperature:acid strength:solubility relationship described above.

The intermediate product of this process, which, according to this invention, is added to the waste acid to strengthen it before it is refrigerated, is an acid having around 60 to 65% $H_2SO_4$, which is obtained by washing the filter cake, produced in the final filtration of the concentrated acid, with crystallization filtrate. If this material is not produced in the process in sufficient quantity to make the desired adjustment in the waste acid strength, then it can be supplemented with some of the 80% $H_2SO_4$ product acid.

It should be pointed out that if some other means of refrigeration, not involving a cold surface for heat transfer, such as Dry Ice or an expanding gas, is used for chilling the waste acid, then it is not necessary to make adjustment of the waste acid strengths.

Although other ways were found whereby the molar ratio of $$\frac{FeSO_4+MgSO_4}{TiOSO_4}$$

values in the acid could be adjusted, as to form the complex salt; for example, by adding proper amounts of a titanium compound such as titania hydrate or $TiOSO_4$ to the crystallization filtrate, this procedure was found to be less desirable than that hereinabove described in that the addition of more titanium values to the acid results in the formation of excessively large amounts of solids during concentration of the acid and hence a corresponding decrease in yield of $H_2SO_4$.

In order to further illustrate the process of the instant invention, the following examples are given:

EXAMPLE I

To 18 liters of waste acid liquor recovered from a titanium sulfate solution containing 1.0% $Al_2(SO_4)_3$, 23.8% $H_2SO_4$, 10.2% $FeSO_4$, 1.2% $TiOSO_4$ and 1.0% $MgSO_4$ was added 162 grams $(NH_4)_2SO_4$. The mixture was chilled to $-40°$ C. and held at this temperature for 4 hours after which it was filtered to remove the ferrous sulfate and alum compounds as a crystalline mass.

The filtrate contained 0.05% $Al_2(SO_4)_3$, 28.3% $H_2SO_4$, 0.8% $FeSO_4$, 1.3% $TiOSO_4$ and 0.5% $MgSO_4$. The molar ratio of $$\frac{(FeSO_4+MgSO_4)}{TiOSO_4}$$

was 1.15.

A 4 liter portion of this filtrate was concentrated to about 75% $H_2SO_4$ by evaporating water from it followed by a twenty-four hour aging period at $70°$ C. before filtration. Upon filtration substantially all of the iron, magnesium and titanium values were removed as a complex salt having the formula $$(Fe,Mg)SO_4 \cdot TiOSO_4 \cdot 2(H,NH_4)_2SO_4$$

The filtrate was a solids-free acid concentrate containing 83% $H_2SO_4$ which remained free of solids even after two months storage.

EXAMPLE II

Eighteen liters of waste acid liquor recovered from a titanium sulfate solution and substantially identical to that used in Example I was chilled to $-10°$ C. and kept at this temperature for 4 hours after which it was filtered to remove the ferrous sulfate and alum compounds as a crystalline mass. The filtrate contained 0.3% $Al_2(SO_4)_3$, 27.7% $H_2SO_4$, 2.8% $FeSO_4$, 1.4% $TiOSO_4$ and 0.8% $MgSO_4$. The molar ratio of $$\frac{(FeSO_4 + MgSO_4)}{TiOSO_4}$$

was 2.86.

A 4 liter portion of this filtrate was concentrated by evaporation to about 75% $H_2SO_4$ followed by a 24 hour aging period at 70° C. before filtration. Upon filtration only a fraction of the iron, magnesium and titanium values were removed as a complex salt and the residual filtrate consisted of an acid concentrate containing 80% $H_2SO_4$, 0.7% $FeSO_4$, 0.04% $TiO_2$ and 0.44% $MgSO_4$. This acid filtrate was cloudy in appearance and after two months storage contained 14% solids by volume.

EXAMPLE III

A waste acid liquor recovered from a titanium sulfate solution and having an analysis similar to that of the waste acid used in Example I was chilled to approximately $-25°$ C. and kept at this temperature for 4 hours after which it was filtered to recover the ferrous sulfate and alum compounds as a crystalline mass.

Analysis of the filtrate showed the presence of 0.1% $Al_2(SO_4)_3$, 26.3% $H_2SO_4$, 1.1% $FeSO_4$, 1.2% $TiOSO_4$ and 0.5% $MgSO_4$. The molar ratio of $$\frac{(FeSO_4 + MgSO_4)}{TiOSO_4}$$

was 1.50.

A 4 liter portion of this filtrate was concentrated by evaporation to about 75% $H_2SO_4$, aged 24 hours at 70° C. and filtered. Upon filtration, only a fraction of the iron, magnesium and titanium values were removed as a complex salt and the residual filtrate consisted of an acid concentrate containing 80.6% $H_2SO_4$, 0.5% $FeSO_4$ and 0.1% $TiOSO_4$. This product was cloudy and upon standing for two months contained 10% solids by volume.

A second 4 liter portion of this same filtrate was treated by adding to it $TiOSO_4$ so that the analysis of the filtrate was 1.1% $FeSO_4$, 1.7% $TiOSO_4$ and 0.5% $MgSO_4$. The molar ratio of $$\frac{(FeSO_4 + MgSO_4)}{TiOSO_4}$$

was then 1.07.

Concentration of this second 4 liter portion of 26.3% $H_2SO_4$ filtrate by evaporation to about 75% $H_2SO_4$, followed by a 24 hour aging period at 70° C. before filtering yielded, after filtration, an acid concentrate which contained 82.4% $H_2SO_4$. This acid concentrate was substantially free of solids even after standing for two months.

EXAMPLE IV

To 12 liters of waste acid liquor recovered from a titanium sulfate solution containing 0.91% $Al_2(SO_4)_3$, 22.5% $H_2SO_4$, 9.9% $FeSO_4$, 1.04% $TiOSO_4$ and 1.0% $MgSO_4$ was added 108 grams $(NH_4)_2SO_4$. The mixture was chilled to $-31°$ C. and held at this temperature for 4 hours after which it was filtered to remove the ferrous sulfate and alum compounds as a crystalline mass.

The filtrate contained 0.05% $Al_2(SO_4)_3$, 27.3% $H_2SO_4$, 1.06% $FeSO_4$, 1.26% $TiOSO_4$ and 0.6% $MgSO_4$. The molar ratio of $$\frac{(FeSO_4 + MgSO_4)}{TiOSO_4}$$

was 1.08.

A 4 liter portion of this filtrate was concentrated to about 75% $H_2SO_4$ by evaporating water from it followed by a twenty-four hour aging period at 70° C. before filtration. Upon filtration substantially all of the iron, magnesium and titanium values were removed as a complex salt having the formula $$(Fe,Mg)SO_4 \cdot TiOSO_4 \cdot 2(H,NH_4)_2SO_4$$

The filtrate was a solids-free acid concentrate containing 81.6% $H_2SO_4$ which remained free of solids even after two months storage.

EXAMPLE V

A blend of two filtrates was prepared by admixing a filtrate having the composition 30.7% $H_2SO_4$, 0.52% $FeSO_4$, 0.6% $TiO_2$, 0.45% $MgSO_4$ and 1.18% $Al_2(SO_4)_3$ with a filtrate having the composition 25.0% $H_2SO_4$, 0.8% $FeSO_4$, 0.65% $TiO_2$, 0.60% $MgSO_4$ and 1.21% $Al_2(SO_4)_3$. The composition of the blend comprised: 29.3% $H_2SO_4$, 0.62% $FeSO_4$, 0.61% $TiO_2$, 0.50% $MgSO_4$ and 1.19% $Al_2(SO_4)_3$. The molar ratio of $$\frac{(FeSO_4 + MgSO_4)}{TiOSO_4}$$

of the blend was 1.08.

A 4 liter portion of this filtrate was concentrated to about 75% $H_2SO_4$ by evaporating water from it followed by a twenty-four hour aging period at 70° C. before filtration. Upon filtration substantially all of the iron, magnesium and titanium values were removed as a complex salt having the formula $$(Fe,Mg)SO_4 \cdot TiOSO_4 \cdot 2(H,NH_4)_2SO_4$$

The filtrate was a solids-free acid concentrate containing 82.4% $H_2SO_4$ which remtained free of solids even after two months storage.

Although the monovalent alum-forming constituent disclosed in the examples is ammonium sulfate other ammonium compounds as well as potassium compounds such as $NH_4OH$, $K_2CO_3$, $(NH_4)_2CO_3$, $NH_4Cl$, $NH_4C_2H_3O_2$, $KOH$ and $KCl$ may be employed with equal success as the alum-forming constitutents.

The invention is particularly effective in purifying and recovering the acid values from waste acids formed in titanium pigment producing operations but it will be understood that it is useful also in treating any waste acid containing aluminum, iron, titanium and magnesium impurities. It has been also clearly shown by the description of the instant invention and by the examples presented that a substantially pure concentrated sulfuric acid product is obtained which is substantially free of solids even after long periods of storage. Moreover, the invention has many advantages over processes which have been used heretofore inasmuch as it is relatively simple and readily adaptable to commercial scale operations.

While this invention is described and illustrated by the examples shown, it is not intended to be strictly limited thereto and other variations and modifications may be employed within the scope of the following claims.

We claim:

1. A process for treating waste $H_2SO_4$ liquor containing trivalent alum-forming cations and solubilized metallic impurities including iron, magnesium and titanium values to obtain a substantially solids-free acid concentrate comprising the steps of: adding to said waste acid liquor a monovalent alum-forming constituent selected from the group consisting of compounds of ammonium and potassium to precipitate an alum salt together with said metallic impurities in the form of a crystalline mass upon cooling said waste acid liquor, removing heat from said waste acid liquor to cool the latter to a temperature within the range of from —26° C. to —47° C. thereby forming a crystalline mass of said alum salt and said metallic impurities, filtering the waste acid liquor to separate and remove said mass of crystalline salt and produce a residual acid filtrate substantially free of alum-forming cations and metallic impurities, adjusting the acid concentration of said residual acid filtrate to within the range of from 23% to 33% $H_2SO_4$ in accordance with the temperature of said acid filtrate, the higher acid concentration being used with the higher temperatures and the lower acid concentrations with the lower temperatures such that any residual iron, magnesium and titanium values in said residual acid filtrate are within the molar ratio range ($FeSO_4+MgSO_4$) to $TiOSO_4$ of from 0.8 to 1.25, concentrating said acid filtrate to at least 80% $H_2SO_4$ thereby precipitating the residual iron, magnesium and titanium values from said concentrated acid filtrate as an insoluble complex salt and then filtering said concentrated acid filtrate to separate said complex salt therefrom and produce a solids-free acid concentrate.

2. A process for treating waste sulfuric acid liquor according to claim 1 wherein the concentration of the residual acid filtrate is 23% $H_2SO_4$ and the temperature to which the acid is cooled is in the range of from —41° C. to —47° C.

3. A process for treating waste sulfuric acid liquor according to claim 1 wherein the concentration of the residual acid filtrate is 33% $H_2SO_4$ and the temperature to which the acid is cooled is in the range of from —26° C. to —32° C.

4. A process for treating waste sulfuric acid liquor according to claim 1 wherein the residual acid filtrate is heated to concentrate said acid filtrate to at least 80% $H_2SO_4$ and the insoluble complex salt has the formula $$(Fe,Mg)SO_4 \cdot TiOSO_4 \cdot 2(H,NH_4)_2SO_4$$

5. A process for treating waste sulfuric acid liquor according to claim 1 wherein the molar ratio range ($FeSO_4+MgSO_4$) to $TiOSO_4$ is from 1.1 to 1.2.

References Cited in the file of this patent

UNITED STATES PATENTS

| | | |
|---|---|---|
| 1,812,310 | Stockley et al. | July 30, 1931 |
| 2,280,508 | Bousquet et al. | Apr. 21, 1942 |
| 2,344,429 | Van Gelder | Mar. 14, 1944 |